Sept. 14, 1937.  J. H. MUTH  2,092,984

CUTTING TOOL

Filed Aug. 13, 1934

INVENTOR.
JOHN H. MUTH

BY
C. I. Heinkel,
ATTORNEY.

Patented Sept. 14, 1937

2,092,984

UNITED STATES PATENT OFFICE 2,092,984

CUTTING TOOL

John H. Muth, East Cleveland, Ohio

Application August 13, 1934, Serial No. 739,519

1 Claim. (Cl. 77—72)

The present invention relates to improvements in cutting tools.

An outstanding feature of the present invention is a cutting edge on the end of the tool and extending circularly or peripherally of the tool to the full length of the cutting edge as distinguished from such tools as reamers wherein the cutting edges extend substantially longitudinally thereof and as distinguished from such tools as counterbores wherein the cutting edges extend radially. Spiral cutting teeth have been used to effect positive and negative cutting rakes and prevent clogging up by chips but even these cutting edges extend substantially longitudinally of the tools whereas the cutting edges of the present invention extend substantially circularly or peripherally of the tool and chips do not pack in the flutes to spoil work. The present invention effects a shaving cut as distinguished from the prior art wherein the cut is generally taken squarely. A squarely taken cut will never produce such smooth work as a shaving cut.

In the present invention, the cutting edges extend circularly or peripherally on the end of the tool body and cut the full width thereof as distinguished from the prior art wherein the cutting edges extend longitudinally of the body and cut only with longitudinal edges along one wall of the flutes thereof in the case of such tools as reamers and only with radial edges in such tools as counterbores.

An important object of the present invention is to provide an axially movable cutting tool with means for producing a shaving cut by a circularly extending cutting edge.

A further object of the invention is to effect cutting by circular end face of a cutting tooth.

A further object of the invention is to effect easy and quick removal and renewal of cutting blades having circularly extending cutting edges of the ends thereof.

A further object of the invention is to provide radial adjustment of cutting blades relative to the body of a tool which blades have circularly extending cutting edges on the ends thereof.

A further object of the invention is to eliminate the packing of chips at the sides of teeth and cutting blades.

A further object of the invention is to provide an easily and quickly releasable and effective stop means for cutting teeth.

Other objects will be pointed out during the following description of the present invention, or will become apparent or obvious or will suggest themselves upon an inspection of the accompanying drawing and this specification.

The present invention is illustratively shown in the accompanying drawing as being applied to reamers but applicant is fully aware that the present invention can be applied to other tools such as milling cutters, counterbores and many others of the same nature.

In the accompanying drawing, forming part of this specification:

Similar reference characters refer to similar parts throughout the views.

Figures 1, 2:
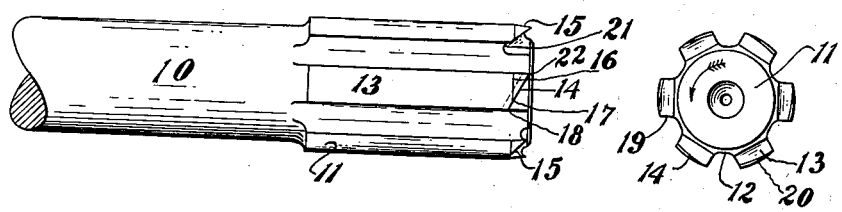
Fig. 1 is a side view of the front end of a reamer having a plurality of straight flutes and teeth axially thereof and a cutting edge on an end of each tooth and traversing the same and embodying the present invention.
Fig. 2 is an end view of Fig. 1 showing teeth relations and cutting edges as viewed endwise.

The reamer shown in Figs. 1 and 2 is what is generally known as a solid reamer. It is, of course, quite obvious that the same can be made expansible by slitting the body part thereof so that the front end can be made diametrically expansible and inserting an expanding member to effect such expansion by manipulation of the expanding member. Any of the known expanding means may be used. For instance, a taper plug may be used to expand the body upon axial movement of the member relative to the body.

The shank 10 forms one end of the reamer shown in Figs. 1 and 2 and may have a taper end to fit a taper socket or any kind of an end as may be required to hold and drive the reamer.

The body 11, on one end of the shank and integral therewith, as shown, may be made as a separate unit and held in driving relation with the shank, has the flutes 12 therein, six in the present instance although any other number could be used. These flutes leave the teeth 13, six in number, and are shown as being parallel with the axis of the reamer although the same may be inclined to this axis, in either direction, so that the cutting teeth may have either a positive or a negative cutting rake. This cutting rake, however, is used in this invention for chip moving and itself has nothing to do with the cutting by the reamer as is further explained herein below. The main object of the flutes is to get lubricant to the cutting end of the reamer. The chips produced by the cutting of the reamer, are produced on the end of the reamer where the same can easily fall into the hole being reamed by gravity. The chips are not produced by a side of the teeth 13 in this invention and, therefore, do not collect in the flutes.

The cutting edge 14 of each tooth is on the leading end of the outer surface of the tooth and begins at 18, the base of the tooth and ends at 22a, the most forward part of the tooth. Each cutting edge is inclined to or disposed in a plane angularly related to a plane at right angles with the longitudinal axis of the reamer and the angle of inclination being different than a right angle, preferably less than a right angle, an angle of 30 degrees being shown. Each cutting edge 14 has a portion, from the point 18 to the point 17 or from the base of the tooth forward to the line 16, that is substantially of the same diameter and the same circular contour as the circumferential outside of the reamer body so that grinding of the cutting edge does not diminish the sizing by the reamer. The portion of each cutting edge, forward of the line 16 is tapered as shown to provide a cutting pilot for the reamer. The planes of the cutting edges are shown as being radial with the reamer. However, there may be angularity between these planes in some instances for such purposes as having one cutting tooth produce a chip a little thinner or thicker than a chip produced by another cutting tooth for such purposes as producing a smoother cut by the reamer or preventing the vibrations of all cutting edges from being alike to eliminate chattering and similar undesirable features. Ordinarily, the reamer shown and described cuts smooth and does not chatter but conditions may arise, due to work operated upon or condition of a machine wherein the reamer is used or other causes, wherein angular relations of the planes of the cutting edges may solve such problems as have been mentioned when the same do arise.

In the present instance, in addition to the formation of the cutting edge described above, each of the teeth 13 is also tapered relative to the longitudinal axis of the reamer, thus providing the inclined surface 15 which extends substantially from the line 16 to the end of the tooth. This line 16 starts at the point 17 in this instance, it may, however, start from the point 18 or any point intermediate or beyond the points mentioned. In practice, it has been found that good general results are attained when the taper starts substantially when the line 16 is located as shown.

The side 19 of the teeth is commonly considered or called the cutting side of the tooth in reamers of the prior art when the reamer is rotated as shown by the arrow on Fig. 2. In the present invention, however, no side of a tooth does any cutting. The outer circumferential, convex surface 20 of each tooth is shown as being slightly eccentric to prevent binding of the reamer in a hole being reamed. In the present invention, the eccentricity is provided only to relieve friction so that the reamer body is better guided in the hole which it is reaming than in the prior art and, therefore, reams a hole more straight or more in alinement with a guide for the reamer when such a guide is used.

The sides 19 of the teeth are shown without undercuts such as are frequently used in the prior art since these sides do no cutting in the present invention and any undercutting thereof would be provided for purposes other than promoting of cutting.

The end faces of the teeth may have, and preferably do have, the undercut 21 therein. This undercut provides cutting clearance and promotes cutting by the ends of the teeth. Cutting clearance is well known in the art but is applied to the ends of the cutting teeth instead of to the sides of the prior art.

In operation, the reamer rotates in the direction of the arrow shown on Fig. 2. In this operation, the tapered end 15 first enters the hole to be reamed and the parts 22 of the cutting edges 14 first contacts and starts the reaming in the hole to be reamed. As the reamer is fed further into the hole, the entire edges 14 come into contact with the material to be removed by the reaming and, eventually ream the entire hole. Since the cutting edges 14 are inclined relative to the axis of the reamer and also to an axis perpendicular thereto, the cutting edges perform a shaving cut which, as is well known, is much more smooth than the usual side cutting or shearing tools could produce. The inclination of the edges 14 covers the feed of the reamer so that tool marks and the like, produced by side cutting tools, are not produced with the present reamer so that the reamer can be fed much faster and yet produce a better reamed hole than in the prior art. The present invention eliminates the clogging of chips in the flutes in that no chips are produced by the sides of the cutting teeth.

Figures 3, 4:
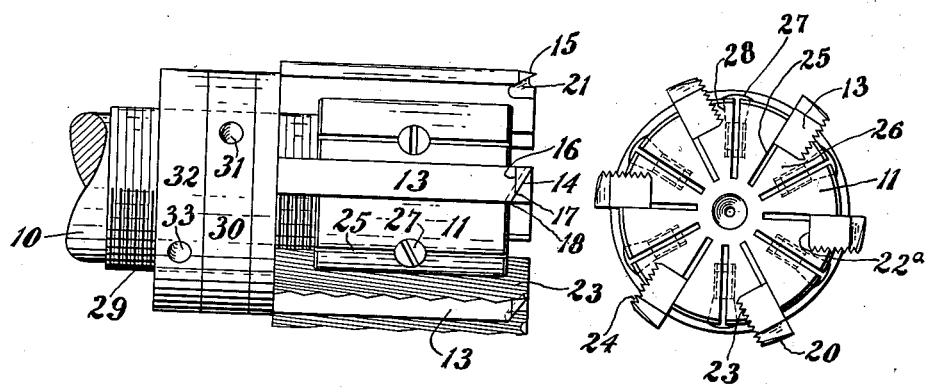
Fig. 3 is a side view of the front end of an adjustable reamer with inserted blades, also embodying the present invention, the teeth also being shown straight and parallel with the axis of the reamer; this view being partly in section to show relation between cutting teeth and body and cutting edge more clearly.
Fig. 4 is an end view of Fig. 3 showing more clearly the manner of inserting the blades and clamping the same in position.

The reamer shown in Figs. 3 and 4 has the same characteristics as the one described herein above but this reamer is shown with an adjusting means for diametrical expansion and contraction of the cutting blades bodily as compared with the above described expansion and contraction of only the end of the reamer body. The latter means of expansion and contraction robs the reamer of some of its guiding feature while the former retains this guiding feature during any adjustment of the reamer.

This reamer also has the shank 10 and the body 11 and also has the equal number of six cutting teeth 13, also shown parallel with the axis of the reamer, which cutting teeth, however, in this instance, are not integral with the body but are individually inserted therein. The cutting edges 14, the taper 15, the lines 16, and points 17 and 18 are similar to that described herein above, also the surface 20 and the undercut 21. The purposes and functions of these features are also the same as those herein above described.

The body 11 has the six slots 22a therein. One side of each of these slots has the serrations 23 therein, in this instance triangular cross-sectionally. These serrations are parallel with each other but are inclined to the longitudinal axis of the reamer; in the present instance being further away from the axis of the reamer at the front end of the body than at the rear end thereof. However, the direction of the inclination may be reversed.

It is preferred that the inclination of the serrations be parallel with the bottom of the corresponding slot so that the below described diametrical adjustment of the cutting teeth will always leave the bottom of the cutting teeth resting on the bottom of the slots. The bottom of the slots 22a is, for that reason, inclined to the longitudinal axis of the reamer. The side walls of the slots 22a are, in this instance, also parallel with the axis of the reamer although the same could also be inclined thereto if desired.

Each of the teeth 13 is here inserted into the corresponding slots 22a, preferably with the inner edges thereof resting on the bottoms of the slots, and each tooth has the serrations 24 on one side thereof, the serrations being inclined similar to the serrations 23 and of the same formation so that the serrations on the cutting teeth fit to the serrations in the slots.

The body 11 has the slits 25 in an end thereof to divide the same into the prong-like parts 26 which, however, remain integral with the body. The clamping screws 27 are threaded into the body 11 and each has the taper portion 28 engaging a corresponding hole in the body between adjacent prongs so that tightening of the screws moves the prongs separatingly and against the cutting teeth to clamp the same against one side of a slot and the serrations on the cutting teeth in contact and engagement with the serrations on the sides of the slots. The cross-sectional triangular formation of the serrations effects efficient holding of the cutting teeth against radial displacement thereof.

The part 29 of the reamer, between the body 11 and the shank 10 is externally threaded and the adjusting nut 30 is threaded thereonto so that rotation of the nut by hand or through a medium inserted into the holes 31, moves the cutting teeth axially of the reamer and, due to the inclination of the serrations, relative to the axis of the reamer, also moves the cutting teeth diametrically for expansion and contraction thereof as may be required to set the reamer for different sizes of holes, or for regrinding.

Upon releasing of the screws 27, the prongs 26 are released from clamping engagement on the cutting teeth so that each cutting tooth can be moved bodily one or more serrations, diametrically of the body, inwardly or outwardly, when axial adjustment of the cutting teeth is not sufficient to attain a desired diametrical adjustment of the cutting teeth or the cutting teeth, or one or more of them, can be renewed when desired.

Tightening of the screws 27, after adjustment of the cutting teeth, clamps the same in adjusted position in the body.

The lock nut 32 is also threaded onto the part 29 to abut the outer end of the adjusting nut 30 and is tightly screwed against the same by hand or by an instrumentality inserted into the holes 33 therein, to retain the cutting teeth in endwise adjustment relative to the body.

Both of the reamers shown and described are cutting tools and each effects a shaving cut by the end faces of the cutting teeth thereof as distinguished from the cutting by side faces of teeth of the prior art. The cutting teeth are expansible diametrically and renewable and are securely held in position for cutting thereby.

Although I have shown and described my invention as being applied to reamers, adjustable and solid, I am fully aware that my invention can also be applied to other cutting tools and that changes and modifications can be made in the structure and arrangement of parts from that shown and described within the scope and intent and contemplation of the present application and the appended claim and the invention generally.

Therefore, without limiting myself to the precise application of my invention nor to the precise structure and arrangement of parts as shown and described, and having described my invention, I claim:

A reamer body having a noncutting tooth longitudinally thereof and a groove adjacent to the tooth for lubrication and chip clearance, a cutting tooth on the front end of said noncutting tooth and having an inclined cutting edge, the angle of inclination of said cutting edge being different than a right angle relative to the longitudinal axis of the reamer to produce a shaving cut by the operation of the reamer, said cutting edge comprising a sizing portion for final sizing of a hole being reamed and a tapered pilot portion to remove excessive stock in the hole prior to the final sizing by said sizing portion, and that portion of said cutting tooth which has the sizing portion of the cutting edge being concentric with the longitudinal axis of the reamer so that grinding of said cutting edge does not diminish the sizing by said sizing portion.

JOHN H. MUTH.